United States Patent
Glikmann (10) Patent No.: US 10,007,476 B1
(45) Date of Patent: Jun. 26, 2018

(54) SHARING A HOST MOBILE CAMERA WITH A REMOTE MOBILE DEVICE

(71) Applicant: Kevin Glikmann, Woodland Hills, CA (US)

(72) Inventor: Kevin Glikmann, Woodland Hills, CA (US)

(73) Assignee: Kevin Glikmann, Woodland Hills, CA (US)

( * ) Notice: Subject to any disclaimer, the term of this patent is extended or adjusted under 35 U.S.C. 154(b) by 121 days.

(21) Appl. No.: 14/664,876

(22) Filed: Mar. 22, 2015

Related U.S. Application Data (60) Provisional application No. 61/969,228, filed on Mar. 23, 2014.

(51) Int. Cl.
| | | |
|---|---|---|
| *G06F 3/14* | (2006.01) | |
| *G09G 5/00* | (2006.01) | |
| *H04L 29/06* | (2006.01) | |
| *G06F 3/0346* | (2013.01) | |
| *H04L 29/08* | (2006.01) | |
| *H04N 5/232* | (2006.01) | |

(52) U.S. Cl.
CPC .......... *G06F 3/1454* (2013.01); *G06F 3/0346* (2013.01); *G09G 5/006* (2013.01); *H04L 65/60* (2013.01); *H04L 67/125* (2013.01); *H04N 5/23206* (2013.01)

(58) Field of Classification Search
CPC ...... H04L 67/125; G06F 3/0346; H04N 5/232
See application file for complete search history.

(56) References Cited

U.S. PATENT DOCUMENTS

| | | | | |
|---|---|---|---|---|
| 6,917,370 | B2* | 7/2005 | Benton | .................... G06T 15/20 345/204 |
| 2004/0109007 | A1* | 6/2004 | Griss | ................... H04N 5/23293 345/629 |
| 2010/0020223 | A1* | 1/2010 | Vice | ......................... G06T 15/20 348/333.02 |
| 2010/0238194 | A1* | 9/2010 | Roach, Jr. | ................ H04M 3/42 345/629 |
| 2012/0081563 | A1* | 4/2012 | Hinkel | ................ H04N 5/23206 348/211.99 |
| 2013/0100306 | A1* | 4/2013 | Bekiares | ........... G08B 13/19689 348/211.99 |
| 2016/0205308 | A1* | 7/2016 | Maeda | ................ H04N 1/00129 348/207.11 |

* cited by examiner

*Primary Examiner* — Priyank Shah (57) ABSTRACT

A mobile camera sharing system includes a host mobile device and a server. The host mobile device includes a mobile camera sharing client, a camera and embedded orientation sensors. The server is coupled to the host mobile device. The mobile camera sharing client generates a host media stream containing media and data from the orientation sensors which it sends to the server through a standard mobile carrier network. A remote mobile device includes a camera, and embedded orientation sensors. When the server receives the host media stream the server transmits the host media stream to the remote mobile device. As a user moves the remote mobile device the camera sharing client sends real time orthogonal orientation sensor data from the remote mobile device to the server so that when the server receives the orientation sensor data the server transmits the data to the host mobile device.

5 Claims, 7 Drawing Sheets

SHARING A HOST MOBILE CAMERA WITH A REMOTE MOBILE DEVICE

CLAIM OF PRIORITY FROM PREVIOUSLY FILED PROVISIONAL PATENT APPLICATION

This non-provisional patent application claims the benefit of and priority from U.S. provisional patent application No. 61/969,228 filed Mar. 23, 2014, the content of which is expressly incorporated herein by reference.

BACKGROUND OF THE INVENTION

Field of the Invention

This invention relates to video photography and more specifically to remote video photography utilizing a mobile device for sharing a host mobile camera with a remote mobile device.

Description of the Prior Art

With the ubiquitous use of camera enabled mobile devices around the world there is now a desire to allow mobile users with these devices to host and share the camera on their mobile device. This allows either friends or strangers to remotely explore the host's local surroundings sights and sounds through video or still photography. However, there is currently no method that can manage the shared mobile device cameras around the world and there is no precise method of how to communicate the exact position of a host mobile device camera screen viewfinder from a remote mobile device screen viewfinder. Further, it would be useful to host users of mobile devices to create camera share invitation for a certain amount of tokens and time duration of their current location. Remote users search and select a location they would like to view. The remote user and the host user synchronize their mobile device position. Once synchronized, the host user continually matches the orthogonal position of the remote user's mobile device by aligning graphical representations of the host mobile device's orthogonal position and the remote mobile device's orthogonal position. During the camera share session the host user is continually rewarded a token for achieving a high tracking accuracy. The remote user can capture video of the host user's location or align the host user for the perfect picture of the host's location.

U.S. Pat. No. 7,450,157 teaches a joint video and still image pipeline technology, a network may be deployed through the Internet so that a user may acquire a remote high resolution photograph using a low resolution video streamed from a remote camera as a view-finder. The remote camera may enable the user to exercise control from a remote device through the network or other communication channels. A network server may store the video and the high resolution photograph, and either sends the video and the high resolution photograph to the user upon payment or posts the video and the high resolution photograph on a web page. The method for acquiring remote high resolution photographs by a user uses a streaming video as a view finder and includes the steps of connecting a remote device to one or more photo-video acquisition devices individually including a camera, using a connected one of the cameras and generating a video of a scene viewed. The method also includes the steps of using the respective camera to acquire a high resolution photograph from the remote device by using the video streamed from the one or more photo-video acquisition devices as a view-finder and communicating a command from the user to the camera. The remote device is controlled by the user. The method of communicating the command includes the steps of using a communications channel different than a pipeline configured to communicate the video and high resolution photograph, altering an operation the camera with respect to the generation of the video responsive to the command; and processing and transmitting the video and the high resolution photograph obtained from the one or more photo-video acquisition devices. The communications channel and the pipeline include different physical media configured to communicate electrical signals in parallel. The connecting step includes connecting the remote device to the one or more photo-video acquisition devices through a network. With advancements in telecommunications, remote photography utilizing electronic remote devices becomes increasingly desirable. A person often finds a scene interesting or a moment worth remembering, only to discover that either no camera is available to capture the image or he/she is not in the best position to take the picture. Similarly, during a sports event, an audience typically is unable to take the best picture of the game from a distance seat using a personal camera. In addition, a party in a teleconference environment who wants to keep a photograph of another party will realize that low resolution video transmission typically cannot generate high resolution pictures. Remote photography is currently available in limited circumstances. For example, theme parks normally provide electronic photography systems for capturing images of customers participating in rides or events with digital cameras. The images are later sent to the customers through a network after verification of customer information and/or payment information. However, the electronic photography systems only randomly take pictures of the customers, i.e., the customers have no active control over the digital cameras regarding either timing or more advanced features, such as zooming. In addition, the customers cannot preview any live-video before the image acquisition. Using a joint video and still image pipeline technology, a network may be deployed through the Internet so that a user may acquire a remote high resolution photograph using a low resolution video streamed from a remote camera as a viewfinder.

U.S. Pat. No. 8,570,344 teaches an augmented reality device which provides a virtual mask that surrounds the viewer and includes a variation that provides information about the direction to a target item. The variation, which may be a variation in transparency, color, geometric shape, texture, material, lighting, or shading, is associated with the position of the target item so that orientation of the variation in the virtual mask does not change with respect to the direction of the target item. A portion of the virtual mask that is in the direction that the viewer is facing is displayed over the real-world image with the variation in the virtual mask providing information to the viewer about the direction of the target item. When the viewer rotates with respect to the target item, a different portion of the virtual mask that is in the current field of view is displayed. A method of showing the orientation between a viewer and a target item in a display includes the steps of displaying an image of a direction that a viewer is facing; determining the direction that the viewer is facing and generating a virtual mask surrounding the viewer. The virtual mask has a variation that provides information about the direction to a target item, the variation in the virtual mask being associated with the position of the target item so that the orientation of the variation in the virtual mask with respect to the target item does not change. The method also includes the step of displaying over the image a portion of the virtual mask that is in the direction that the viewer is facing. The variation in the virtual mask is visible in the display to provide information to the viewer about the direction of the target item. A common means to determine the location of a device is to use a satellite position system (SPS), such as the well-known Global Positioning Satellite (GPS) system or Global Navigation Satellite System (GNSS), which employ a number of satellites that are in orbit around the Earth. Position measurements using SPS are based on measurements of propagation delay times of SPS signals broadcast from a number of orbiting satellites to an SPS receiver. Once the SPS receiver has measured the signal propagation delays for each satellite, the range to each satellite can be determined and precise navigation time of day of the SPS receiver can then be determined using the measured ranges and the known locations of the satellites. Knowledge of the location of a device has many uses, one of which is known as augmented reality. Augmented reality combines real-world imagery with computer generated data, such as graphics or textual information. Augmented reality may be useful for activities such as navigation or simply orientating oneself within an environment. One of the first and most difficult steps in navigation and information discovery is physically orienting oneself in the correct direction. In order to make use of data in augmented reality, the user generally needs to find and face the target item with the camera. For data or links, the target item is not visible unless the camera is facing the correct direction. For navigation, incorrect orientation results in the user initiating navigation in the wrong direction. Current augmented reality methods for directing the user to elements such as arrows. For example, augmented reality systems may use two or three dimensional arrows in the center or edge of the user's view, indicating rotate left or right. Another directional element that is currently used is a top view radar type display that indicates the relative distance and direction to target items. Current methods of providing orientation information have several problems, however. For example, directional arrows do not provide information with respect to how far one should turn to face the target element. Accordingly, it is difficult to tell how far to turn. Moreover, if the user turns quickly, there is no indication when to slow down so as not to over shoot the desired target item or direction. Further, the use of top view radar displays is distracting as users find it difficult to interpret or determine its relevance and to relate the top view to the user's actual surroundings. When used for navigation, current orientation methods give the user a sense of urgency to orient themselves to the target item causing the user to engage in potentially dangerous behavior, e.g., not facing the direction of travel.

US Patent Publication No. 2012/0092565 teaches an apparatus for remotely controlling an entertainment device using a mobile communication device. A user utilizes a mobile communication device to input information that requests manipulation of playback of content outputted for presentation by an entertainment device. The mobile communication device transmits the user input to the entertainment device, and responsive to receiving the user input, the mobile communication device manipulates playback of the video content. The mobile communication device includes an input device configured to receive user input, a light detection circuit configured to detect light and measure an intensity of the detected light; a motion detector configured to determine positional information of the mobile communication device based on the measured intensity of the detected light and a processor configured to generate a command based on the user input and the positional information and a wireless transmitter configured to transmit the command to the entertainment device. The user input directs playback of content by an entertainment device. The command is compatible with the entertainment device. The entertainment device is configured to utilize the command to output a cursor on a menu and direct playback of the content on a display device communicatively coupled to the entertainment device. The average home presently includes a variety of entertainment devices, each remotely operated by a separate remote control. Therefore, a user often needs to keep track of multiple remote controls while experiencing audio and/or video content. This has been a problem for many users, and modern video viewing systems have become so complex that many users cannot navigate the controls of entertainment devices without the assistance of the associated remote controls. However, because remote controls are easily misplaced, it becomes difficult for users to navigate their video viewing systems without the assistance of advanced navigation tools provided by remote controls.

U.S. Pat. No. 8,478,814 teaches a method for remotely directing a fishing tournament making use of a data network over which participants transmit submissions indicating sizes of fish caught. The submissions may include digital images of fish, and size may be determined from a scale established using a reference object depicted in the image. The data network may also be used to register participants and provide them with tournament results. Participants may register for a fishing period, or multiple fishing periods of the tournament, and may be issued a code to be displayed in images of fish. Validation of entries may include an examination of metadata in submitted digital images. The method for remotely directing a fishing tournament includes the step of receiving by a server a digital image of a fish caught by a tournament participant over a data network and determining by the server a pixel count of the fish and a pixel count of the reference object from the image. The image contains a reference object of a known size adjacent to the fish to allow a determination of scale. The method also includes the steps of determining by the server a size of the fish from the image by using the pixel counts of the fish and the reference object and the scale provided by the reference object and further identifying, within metadata in the digital image, a prohibited type of editing for purposes of invalidating the digital image received by the tournament participant. The system for remotely directing a fishing tournament uses a data network such as the Internet. More specifically, the system is for registering contest participants, receiving entries from participants, determining fish sizes from digital images submitted by participants and reporting the contest winners. Fishing contests, typically referred to as "tournaments," allow anglers to compete against one other in trying to catch the longest or heaviest fish, or collection of fish, over a given period of time. Traditionally, such tournaments are held in a fixed location, and the fish are killed in order to allow them to be measured or weighed at the end of the contest. Recently, however, there has been significant interest in "catch and release" fishing, in which an angler returns a fish to the water alive after catching it. To conduct a tournament in which the fish are not killed, however, requires evidence of the size of the fish, such as a photograph. In addition, it would be desirable to hold a tournament in which participants may be remote from one another, and/or where the organization and direction of the tournament is remote from the participants.

US Patent Publication No. 2003/0115265 teaches a system which holds a location-independent fishing competition in which a sponsor of the competition communicates with participants via the Internet to organize and direct the contest. The participants register for a tournament held during a specific time period by transmission of data over the Internet. After the fishing period is over, they then submit digital images of fish before a predetermined deadline to be compared with those of other participants. To ensure that the image was taken during the fishing period, an "article of certification" must also be shown in the image. The article of certification is an object of a specific type that is designated by the sponsor, and the identity of which is provided to the participants at the outset of the fishing period. An integral part of remotely directing a fishing tournament is providing a means to determine the size of fish submitted by participants. It is possible to rely on self-reporting on the part of participants, or to provide some form of verification by a third party. However, it is also possible to use digital images of fish submitted by participants to establish and/or verify fish sizes.

The inventor hereby incorporates the above-referenced patent into his specification.

SUMMARY OF THE INVENTION

The present invention is a mobile camera sharing system which includes a remote mobile device and a server. The host mobile device includes a mobile camera sharing client, a camera and embedded orientation sensors. The server is coupled to the remote mobile device. The mobile camera sharing client generates a host media stream containing media and data from the orientation sensors which it sends to the server through a standard mobile carrier network.

In a first aspect of the present invention a remote mobile device includes a camera, and embedded orientation sensors. When the server receives the host media stream the server transmits the host media stream to the remote mobile device. As a user moves the remote mobile device the camera sharing client sends real time orthogonal orientation sensor data from the remote mobile device to the server so that when the server receives the orientation sensor data the server transmits the data to the host mobile device.

In a second aspect of the present invention the host mobile device has a screen and the remote mobile has a screen. The orthogonal data generates three-dimensional graphical representations which the users use to align the host mobile device and the remote mobile device together and to know when the screen viewfinders of the host mobile device and the remote mobile device are matched in alignment.

Other aspects and many of the attendant advantages will be more readily appreciated as the same becomes better understood by reference to the following detailed description drawing in which like reference symbols designate like parts throughout the figures.

DESCRIPTION OF THE PREFERRED EMBODIMENT

In the following detail description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized that logical, mechanical, electrical, functional, and other changes may be made without departing from the scope of the present invention.

The following detailed description is, therefore, not to be taken in a limiting sense, and the scope of the present invention is defined only by the appended claims.

Figure 1:
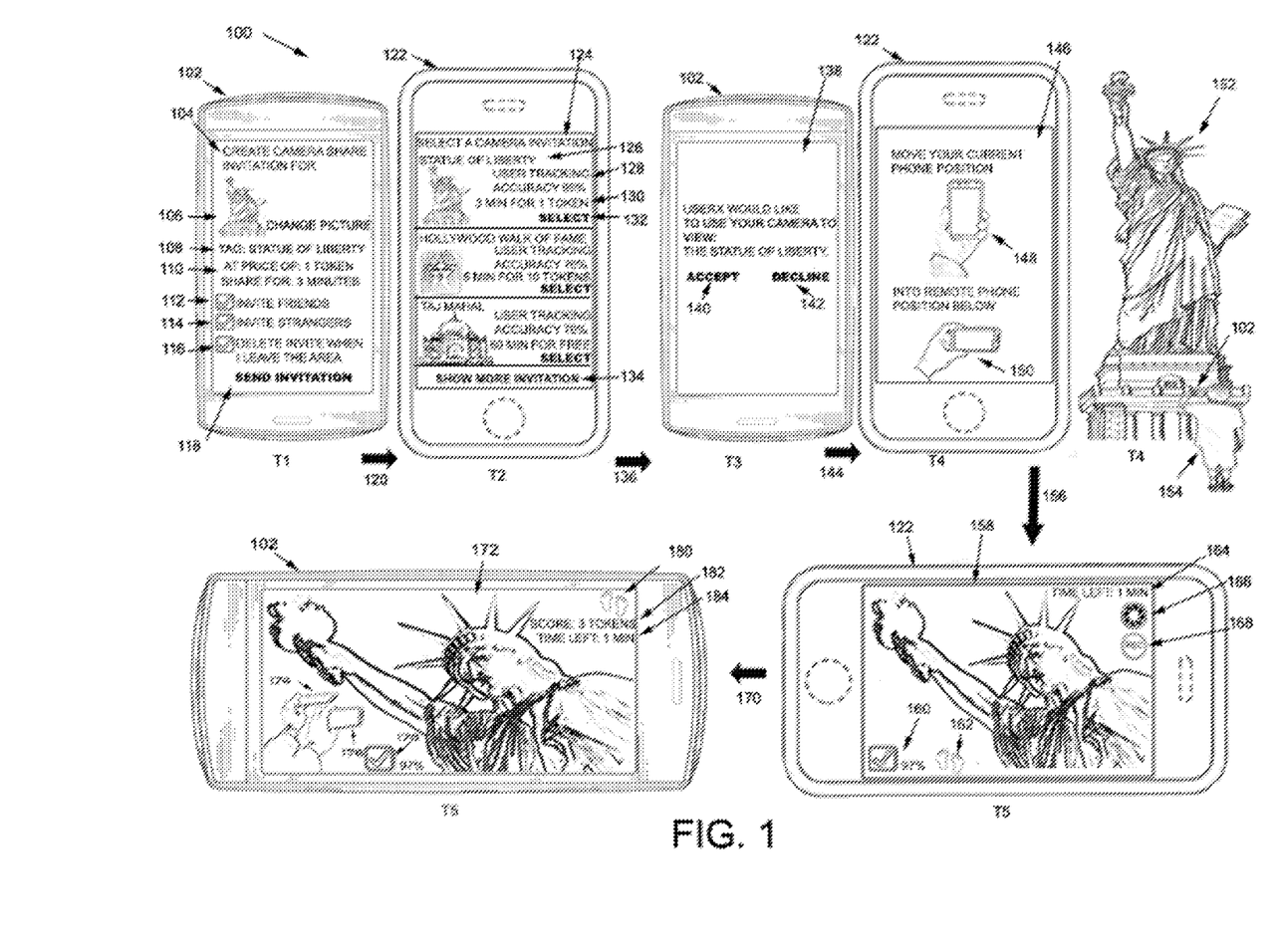
FIG. 1 is a diagram illustrating mobile devices operating in accordance with a first embodiment of the present invention.

FIG. 1 illustrates a host mobile device 102 and remote mobile device 122, such as cellular telephones, a host location 152, a host user 154, at various points during execution of one embodiment of a mobile camera sharing client 100. The mobile camera sharing client 100 is invoked when a host user of a mobile device 102 performs certain actions. Such actions include pressing the camera button, selecting a picture of the surrounding area and creating a camera share invitation. A camera share invitation 104 displays a picture of the host surrounding area 106, a naming tag for the invitation 108, a price for an allotted camera share time 110, a choice to allow friends to use the camera 112, a choice to allow strangers to use 114, a choice to delete the camera share invitation when the user leaves the location 116, and a send invitation button 118 at time T1. The send invitation button 118 sends 120 the invitation data to remote mobile device 122 via a server at T2, and displays a list of available shared camera invitations 124.

In one embodiment the shared camera invitation 124 includes the location name 126, a user tracking accuracy percentage 128, a price for an allotted camera share time 130. The user can activate the show more invitation button 134 to view more shared camera invitation. Assuming the user activates the select button 132, at T2, the mobile camera sharing client 100 sends 136 an acceptance message 138 to the host mobile device 102, at T3 via a server. Assuming the user activates the accept button 140 and not the decline button 142, at T3, the mobile camera sharing client 100 sends 144 an initialization synchronization message 146 to the remote device 122, at T4 via a server, displaying a real time three-dimensional animation of the orthogonal orientation 148 of remote mobile device 122 and a real time three dimensional animation of the orthogonal orientation 150 of host mobile device 102 at time T4 for the remote user. Further, at T4, mobile camera sharing client 100 activates the host user 154 client share mobile device video camera 102 and sends 156 the video stream of location 152 to remote mobile device 122 screen 158, at time T5 via a server. On remote mobile device screen 158, in one embodiment an overlay with remaining time left of camera share 164, a sync indicator with host user tracking accuracy percentage 160, a camera shutter button 166, that initiates the camera shutter on the host device 102, a button to capture video 168, and a directional walking indicator 162. As the user moves the remote mobile device 122, camera sharing client 100 sends 170 real time orthogonal orientation sensor data to host mobile device 102, at T5 via a server, and in one embodiment displays, an overlay with a real time three-dimensional graphical animation of the orthogonal orientation 174 of remote mobile device 122, a real time three-dimensional graphical animation of the orthogonal orientation 176 of host mobile device 102, a sync indicator with host user tracking accuracy percentage 178, a walking directional indicator 180, an earned token reward for maintaining a high tracking accuracy between host and remote orthogonal orientations 182, remaining time left of camera share 184, at time T5.

Figure 2:
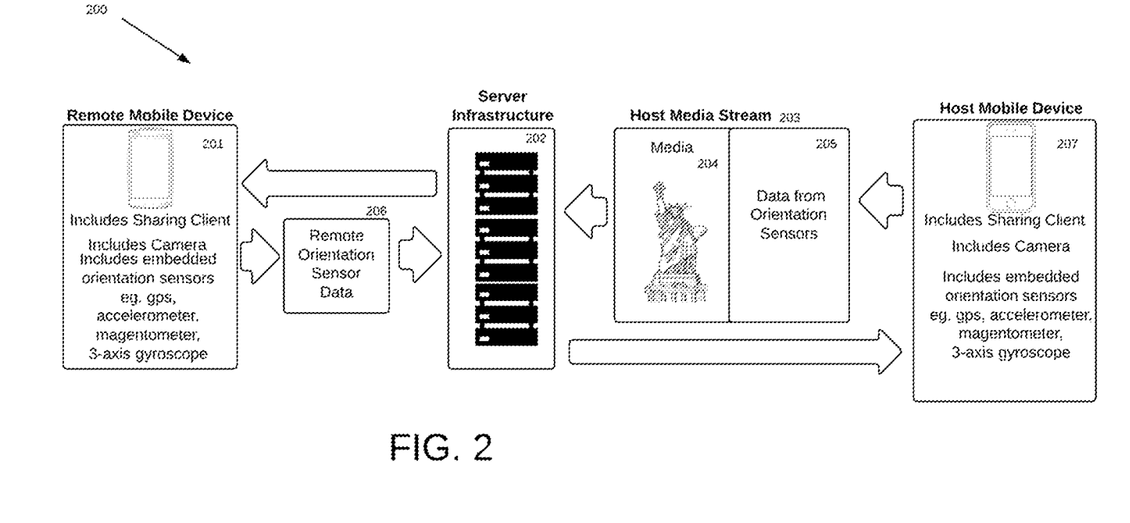
FIG. 2 is a diagram illustrating a system-level overview of an embodiment of the present invention.

A system level overview of the operation of a mobile camera sharing system 200 according to one embodiment is described with the reference to FIG. 2. The mobile camera sharing system comprises a remote mobile device 201, host mobile device 207 and one or more servers 202. Host mobile device 207 includes the mobile camera sharing client 100 described above, camera, embedded orientation sensors, for example, gps, accelerometer, magnetometer and 3-axis gyroscope. The mobile camera sharing client 100 generates a host media stream 203 containing media 204 and data from the orientation sensors 205, which it sends to the server(s) 202 through a standard mobile carrier network. When server (s) 202 receives the host media stream 203 it transmits the host media stream 203 to remote mobile device 201. Remote mobile device 201a includes camera, embedded orientation sensors, for example, gps, accelerometer, magnetometer and 3-axis gyroscope. As the user moves the remote mobile device 201, camera sharing client 100 sends real time orthogonal orientation sensor data 206 from remote mobile device 201 to the server(s) 202. When server(s) 202 receives the orientation sensor data 206 it transmits the data to host mobile device 207.

Figure 3:
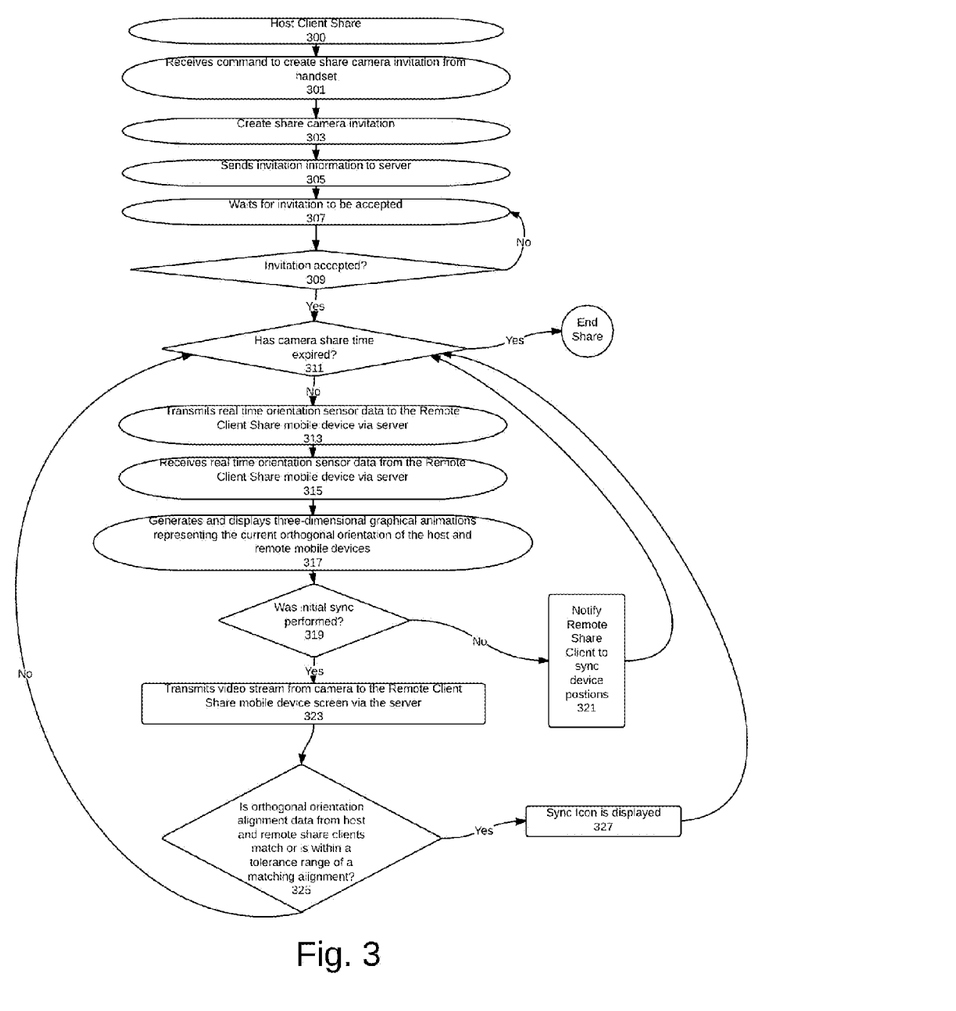
FIG. 3 is a flowchart of a method to be performed by a host client according to an embodiment of the present invention.
Figure 4:
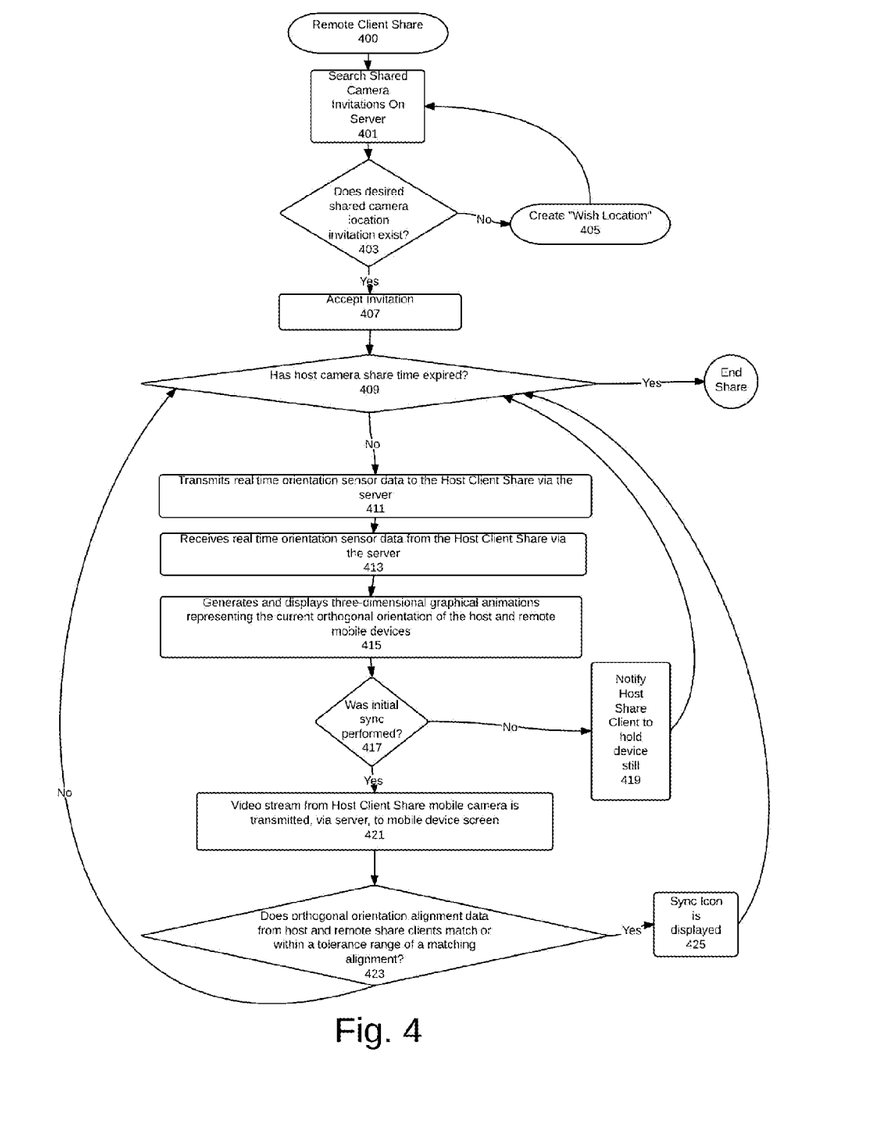
FIG. 4 is a flowchart of a method to be performed by a remote client according to an embodiment of the present invention.

FIG. 3 and FIG. 4 illustrate a method to be executed on a host and remote mobile device according to one embodiment of the invention. Referring to FIG. 3, the acts to be performed by a host client share 300 are shown. At block 301, the host client share method 300 receives a command from the mobile device to create a share camera invitation. The client share method 300 captures the invitation data (block 303), sends the invitation to the server (block 305) and waits for the invitation to be accepted (block 307). If the invitation is accepted (block 309) then if the camera share time has expired 311 then the camera share ends; otherwise, the host client share 300 transmits in real time the orientation sensor data of the host mobile device to the remote client share 400 mobile device via the server (block 313). At block 315, the host client share 300 receives real time orientation sensor data from the remote client share 400 mobile device via the server (block 315). The host client share 300, generates and displays three-dimensional graphical animations representing the current orthogonal orientation of the host and remote mobile devices (block 317). At block 319, host client share 300 determines if the orthogonal orientations of the host and mobile devices have been successfully aligned at least once; thus, indicating that an initial synchronization was performed. If an initial synchronization was not performed, then host client share 300 notifies the remote client share 400 to synchronize the device positions (block 323). Then on successful initial synchronization, a video stream from the host video camera mobile device is transmitted to the remote client share 400 mobile device screen via the server (block 323). If the host client share 300 determines that the orthogonal orientation alignment data from the host and remote share clients match or is within a tolerance range of a matching alignment (block 325) then the sync icon is displayed (block 327) and host share client cycles back to block 311; otherwise, the host client share 300 displays message to physically move the host mobile device (block 321) into position with graphical representation of remote client share 400 orthogonal position data and host share client 300 cycles back to block 311.

Referring to FIG. 4 the acts to be performed by a remote share method 400 receives a command from the mobile device to search shared camera invitation on server. If the user selects a shared camera location (block 403) then remote client share 400 accept the invitation (block 407); otherwise, remote client share 400 displays a message asking if the user would like to create a "wish location" block 405. At block 409, if remote client share 400 determines that host camera share time has expired then the camera share ends; otherwise, at block 411, remote client share 400 transmits in real time the orientation sensor data of the remote mobile device to the host client share 300 via the server (block 411). At block 413, the remote client share 400 receives real time orientation sensor data from the host client share 300 mobile device via the server (block 413). The host client share 400, generates and displays three-dimensional graphical animations representing the current orthogonal orientation of the host and remote mobile devices (block 415). At block 417, remote client share 400 determines if the orthogonal orientations of the host and mobile devices have been successfully aligned at least once; thus, indicating that an initial synchronization was performed. If an initial synchronization was not performed, then remote client share 400 notifies the host client share 300 to synchronize the device positions (block 419) and remote client share 400 cycles back to block 409. Then on successful initial synchronization a video stream from host video camera mobile device is received from host client share 300 the remote client share 400 mobile device screen via the server (block 421). If the remote client share 400 determines that the orthogonal orientation alignment data from the host and remote share clients match or is within a tolerance range of a matching alignment (block 421) then the sync icon is displayed (block 425) and remote share client 400 cycles back to block 409; otherwise, the remote client share 400 cycles back to block 409.

Figure 5:
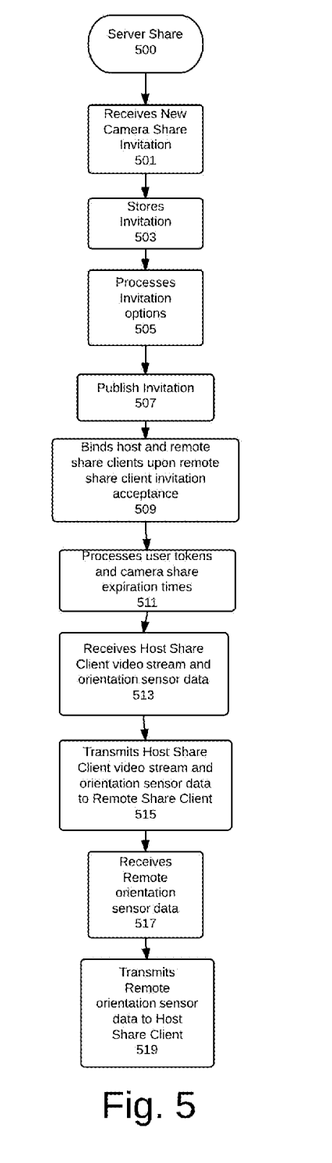
FIG. 5 is a flowchart of a method to be performed by a server according to an embodiment of the present invention.

FIG. 5 illustrates a server that operates in conjunction with the client methods of FIG. 3 and FIG. 4. FIG. 5 illustrates the acts to be performed by a computer acting as a server executing a server share method 500. The server share method 500 receives the invitation request from a mobile device (block 501), stores invitation request (block 503), processes invitation options (block 505), publishes the camera share invitation (block 507), binds the host and remote share clients upon remote share client invitation acceptance (block 509), processes user tokens and camera share expiration times (block 511), receives host share client video stream and orientation sensor data (block 513), transmits host share client video stream and orientation sensor data to remote share client (block 515), receives remote orientation sensor data (block 517), and transmits remote orientation sensor data to host share client (block 519). In practice, the methods 300, 400, 500 may executable instructions. Describing the method with reference to the flowchart FIG. 3, FIG. 4 and FIG. 5 enable one skilled in the art to develop such programs, including such instructions to carry out the operations (acts) represented by the logical blocks on suitably configured machines (the processor of the machine executing the instructions form machine-readable media). The machine-executable instructions may be written in a computer programming language or may be embodied in firmware logic or in hardware circuitry. If written in a programming language conforming to a recognized standard, such instructions can be executed on a variety of hardware platforms and for interface to a variety of operating systems. In addition, the present invention is not described with reference to any particular programming language. In fact, a variety of programming languages may be used to implement the teachings of the invention as described herein. It should be noted that it is common in the art to speak of software, in one form or another (e.g., program, procedure, process, application, module, logic . . . ), as taking an action or causing a result. These expressions are merely a shorthand way of saying that execution of the software by a machine causes the processor of the machine of perform an action or produce a result. It will be appreciated that more or fewer processes may be incorporated into the methods illustrated in FIG. 3, FIG. 4 and FIG. 5 without departing from the scope of the invention and that no particular order is implied by the arrangement of blocks shown and described herein.

Figure 6A:
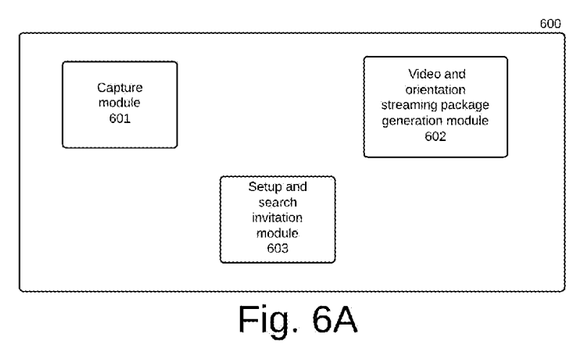
FIG. 6A and FIG. 6B illustrate modules that implement the methods of the present invention.

Particular implementations of the methods are now described with reference to modules illustrated in FIG. 6A and FIG. 6B. In FIG. 6A, a set of modules 600 for a mobile device include a capture module 601, a video and orientation streaming package generation module 602 and a setup and search invitation module 603. The capture module 601 comprises computer instructions that capture the video and mobile device orientation sensor data. The video and orientation streaming package generation module 602 comprises computer instructions that synchronize the video and orientation sensor data into a streaming package for transmission to the server. In addition, the video and orientation streaming package generation module 602 comprises instruction that creates network messages containing the video and orientation streaming package in accordance with the protocols of the network connecting the mobile device and the server. The setup and search module 603 comprises instructions that create a share camera invitation and search form and format the received form information for transmission to the server.

Figure 6B:
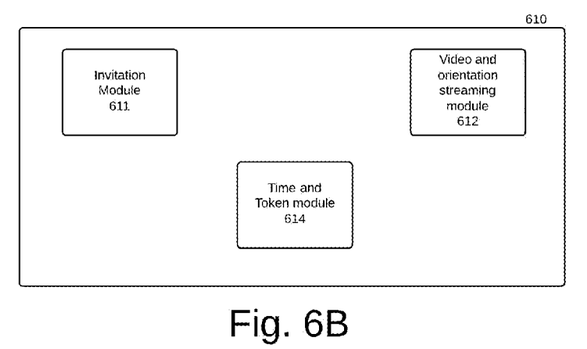

In FIG. 6B, a set of modules 610 for a server include an invitation module 611, video and orientation streaming module 612, time and token module 614. The invitation module 611 comprises instructions to handle user requests for creating, searching, and accepting of camera shares. The video and orientation streaming module comprises instructions to 1) handle the incoming host video stream and transmit the video stream to the remote mobile device and 2) to receive and transmit the orientation sensor data between the host and remote mobile devices. The time and token module 614 comprises instructions to handle token payments and time expiration for camera shares.

Figure 7:
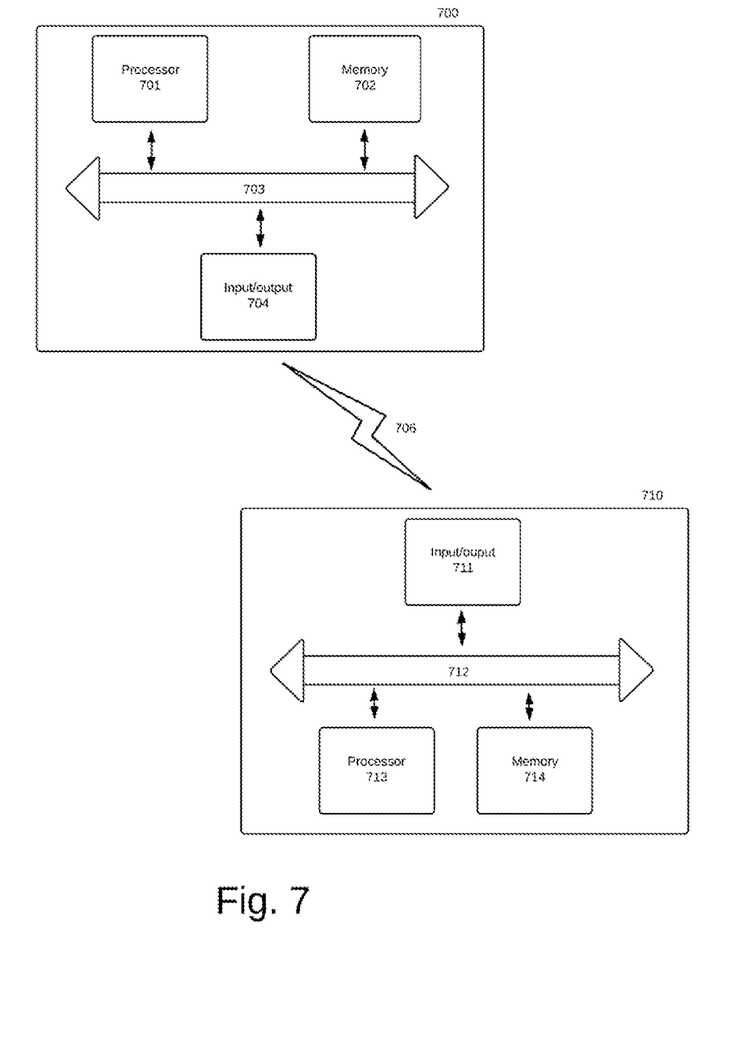
FIG. 7 is a diagram of one embodiment of a mobile device and a computer system suitable for use with the present invention.

The following description of FIG. 7 is intended to provide an overview of hardware and other operating components suitable for performing the methods of the invention described above, but is not intended to limit the applicable environments. As shown in FIG. 7, a mobile device 700 is connected to a server 710 through a wireless network 706. The mobile device 700 contains a processor 701, memory 702, and an input/output component 704 coupled to a bus 703. The memory 702 is configured to store instructions which, when executed by the processor 701, perform the methods described with reference to FIG. 3 and FIG. 4. In addition, the memory 702 stores the modules illustrated in FIG. 6A and the mobile device described above. The input/output component includes a display and a keypad, and a network interface. Similarly, the server 710 contains a processor 713, memory 714, and an input/output component 711 coupled to a bus 712. The memory 714 is configured to store instructions which, when executed by the processor 713, perform the methods described with reference to FIG. 5. In addition, the memory 714 stores the modules illustrated in FIG. 6B and the server data described above. The input/output component 711 includes a network interface for connection to the mobile device 700. The input/output components 704, 711 also encompass various types of computer readable media, including any type of storage device that is accessible by the processors 701, 713. Those skilled in the art will certainly recognize that the term "computer readable medium/media" further encompasses a carrier wave that encodes a data signal. It will also be appreciated that the mobile device 700 and the computer 710 are controlled by operating system software executing from their respective memories. The input/output components and related media store the computer-executable instructions for the operating system and methods of the present invention as well as data.

Those skilled in the art will certainly appreciate that the invention can be practiced with other system configurations, including multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

The term "internet" as used herein refers to a network of networks which use certain protocols, such as the TCP/IP protocol, and possibly other protocols such as the hypertext transfer protocol (HTTP) for hypertext markup language (HTML) documents that make up the World Wide Web. The physical connections to the Internet and the protocols and communication procedures of the Internet are well known to those of skill in the art.

A method and system of sharing a host mobile device camera with a remote mobile device has been described. Host users of mobile devices create camera share invitations for a certain amount of tokens and time duration of their current location. Remote users search and select a location they would like to view. The remote and host user synchronize their mobile device positions; thus, synchronizing their camera screen view finders. Once synchronized, the host user continually matches the remote user's mobile device orthogonal positioning by aligning graphical representations of the host and remote mobile devices orthogonal positions. During the camera share session the host user is continually rewarded with tokens for achieving a high tracking accuracy. The remote user can precisely align the host user's screen viewfinder for capturing video or to take the perfect high resolution picture by triggering the host user's mobile device camera shutter.

From the foregoing it can be seen that remote video photography utilizing mobile device for sharing a host mobile camera with a remote mobile device has been described. It should be noted that the sketches are not drawn to scale and that distances of and between the figures are not to be considered significant.

Accordingly it is intended that the foregoing disclosure and showing made in the drawing shall be considered only as an illustration of the principle of the present invention.

What is claimed is:

1. A mobile camera sharing system comprising:
a. a host mobile device including:
i. a camera sharing client;
ii. a first camera being coupled to said camera sharing client wherein said host mobile device displays a real time three-dimensional animation of an orthogonal orientation;
iii. a first embedded orientation sensor for sensing orthogonal data of said host mobile device; and
iv. a trigger coupled to said first camera;
b. a server coupled to said host mobile device whereby said camera sharing client of said host mobile device generates a host media stream containing media and data from said first embedded orientation sensor which said host mobile device sends to said server through a standard mobile carrier network; and
c. a remote mobile device including:
i. a second camera wherein said remote mobile device displays said real time three-dimensional animation of the orthogonal orientation; and
ii. a second embedded orientation sensor for sensing orthogonal data of said remote mobile device whereby when said server receives said host media stream said server transmits said host media stream to said remote mobile device so that as a user moves said remote mobile device said second camera sharing client sends real time orthogonal orientation sensor data from said remote mobile device to said server so that when said server receives said real time orientation sensor data said server transmits said real time orthogonal orientation sensor data to said host mobile device.

2. A mobile camera sharing system comprising:
a. a host mobile device including:
i. a camera sharing client;
ii. a first camera being coupled to said camera sharing client wherein said host mobile device displays a real time three-dimensional animation of an orthogonal orientation; and
iii. a first embedded orientation sensor for sensing orthogonal data of said host mobile device;
b. a server coupled to said host mobile device whereby said camera sharing client of said host mobile device generates a host media stream containing media and data from said first embedded orientation sensor which said host mobile device sends to said server through a standard mobile carrier network; and
c. a remote mobile device including:
i. a second camera; and
ii. a second embedded orientation sensor for sensing orthogonal data of said remote mobile device whereby when said server receives said host media stream said server transmits said host media stream to said remote mobile device so that as a user moves said remote mobile device said second camera sharing client sends real time orthogonal orientation sensor data from said remote mobile device to said server so that when said server receives said real time orientation sensor data said server transmits said real time orthogonal orientation sensor data to said host mobile device wherein said host mobile device displays a real time three-dimensional animation of the orthogonal orientation of said remote mobile device and sends said real time three-dimensional animation of the orthogonal orientation of said host mobile device to said remote user as the user moves said remote mobile device, said camera sharing client sends real time orthogonal orientation sensor data to said host mobile device via said server and displays an overlay with said real time three-dimensional animation of the orthogonal orientation of said remote mobile device, said real time three-dimensional animation of the orthogonal orientation in order to determine if the orthogonal orientations of said host mobile device and said remote mobile device have been successfully aligned at least once to indicate that an initial synchronization was performed.

3. A mobile camera sharing system comprising:
a. a host mobile device including:
i. a camera sharing client;
ii. a first camera being coupled to said camera sharing client wherein said host mobile device displays a real time three-dimensional animation of an orthogonal orientation;
iii. a first embedded orientation sensor for sensing orthogonal data of said host mobile device; and
iv. a trigger coupled to said first camera;
b. a server coupled to said host mobile device whereby said mobile camera sharing client generates a host media stream containing media and data from said orientation sensors which it sends to said server through a standard mobile carrier network; and
c. a remote mobile device including:
i. a second camera; and
ii. a second embedded orientation sensor for sensing orthogonal data of said remote mobile device whereby when said server receives said host media stream said server transmits said host media stream to said remote mobile device so that as a user moves said remote mobile device said second camera sharing client sends real time orthogonal orientation sensor data from said remote mobile device to said server so that when said server receives said real time orientation sensor data said server transmits said real time orthogonal orientation sensor data to said host mobile device wherein said host mobile device displays said real time three-dimensional animation of the orthogonal orientation of said remote mobile device and sends said real time three-dimensional animation of the orthogonal orientation of said host mobile device to said remote user as the user moves said remote mobile device, said camera sharing client sends real time orthogonal orientation sensor data to said host mobile device via said server and displays an overlay with said real time three-dimensional animation of the orthogonal orientation of said remote mobile device, said real time three dimensional animation of the orthogonal orientation in order to determine if the orthogonal orientations of said host mobile device and said remote mobile device have been successfully aligned at least once to indicate that an initial synchronization was performed.

4. A mobile camera sharing system according to claim 3 wherein said host mobile device has a screen and said remote mobile device has a screen whereby said orientation sensor of said remote mobile device generate three-dimensional graphical representations of said remote mobile device on said screen of said host mobile device and said orientation sensor of said host mobile device generates three-dimensional graphical representation of said host mobile device on said screen of said remote mobile device which the users use to align said host mobile device and said remote mobile device together and to know when said host mobile device and said remote mobile device are matched in alignment.

5. A mobile camera sharing system according to claim 3 wherein said host mobile device has a screen and said remote mobile has a screen whereby said orthogonal data generates three-dimensional graphical representations of said real time three-dimensional animation of the orthogonal orientation which the users use to align said host mobile device and said remote mobile device together and to know when said host mobile device and said remote mobile device are matched in alignment.

* * * * *